United States Patent
Zhang et al.

(10) Patent No.: US 9,405,442 B1
(45) Date of Patent: Aug. 2, 2016

(54) LIST CONTROL WITH ZOOM OPERATION

(71) Applicant: CA, Inc., Islandia, NY (US)

(72) Inventors: Lizeng Zhang, Beijing (CN); Guoqiang Zhang, Beijing (CN); Yingwei Cai, Beijing (CN); Chenyue Duan, Beijing (CN)

(73) Assignee: CA, Inc., New York, NY (US)

( * ) Notice: Subject to any disclaimer, the term of this patent is extended or adjusted under 35 U.S.C. 154(b) by 105 days.

(21) Appl. No.: 14/017,585

(22) Filed: Sep. 4, 2013

(51) Int. Cl.
*G06F 3/0484* (2013.01)

(52) U.S. Cl.
CPC .................................. *G06F 3/0484* (2013.01)

(58) Field of Classification Search
CPC .............................. G06F 3/0481; G06F 3/0482
See application file for complete search history.

(56) References Cited

U.S. PATENT DOCUMENTS

| | | | |
|---|---|---|---|
| 7,340,677 B2 | 3/2008 | Cowperthwaite | |
| 7,343,568 B2 | 3/2008 | Jiang et al. | |
| 7,477,268 B2 | 1/2009 | Venolia | |
| 8,253,695 B2 | 8/2012 | Ganatra et al. | |
| 2003/0218639 A1* | 11/2003 | Lee | G06F 3/0481 715/853 |
| 2006/0123360 A1 | 6/2006 | Anwar et al. | |
| 2008/0086703 A1* | 4/2008 | Flynt | G06F 3/0482 715/853 |
| 2008/0094369 A1* | 4/2008 | Ganatra | G06F 3/04883 345/173 |
| 2009/0019348 A1 | 1/2009 | King | |
| 2009/0049407 A1* | 2/2009 | Casto | G06F 3/0482 715/828 |
| 2009/0259975 A1* | 10/2009 | Asai | G06F 3/0482 715/850 |
| 2012/0096375 A1 | 4/2012 | Bostick et al. | |
| 2014/0344736 A1* | 11/2014 | Ryman | G06F 9/44 715/767 |

FOREIGN PATENT DOCUMENTS

WO    WO2010/143105 A1    12/2010

* cited by examiner

*Primary Examiner* — Amy Ng
*Assistant Examiner* — Seth A Silverman
(74) *Attorney, Agent, or Firm* — Vierra Magen Marcus LLP

(57) ABSTRACT

A user interface control of a computing device allows a user to zoom in and out of a list of data on a display to set a level of detail with which entries of the list are displayed. For example, when the user invokes a zoom in command, the system can provide a greater level of detail for each entry while increasing a height of a region used for each entry. When the user invokes a zoom out command, the system returns to the original presentation of the list. The system allows the user to invoke the zoom in or zoom out command multiple times. Moreover, each entry can be individually selected for display at the highest level of detail from any of the other, lower levels of detail. Further, a learning function can set an initial level of display, level skipping and entry priorities.

20 Claims, 8 Drawing Sheets

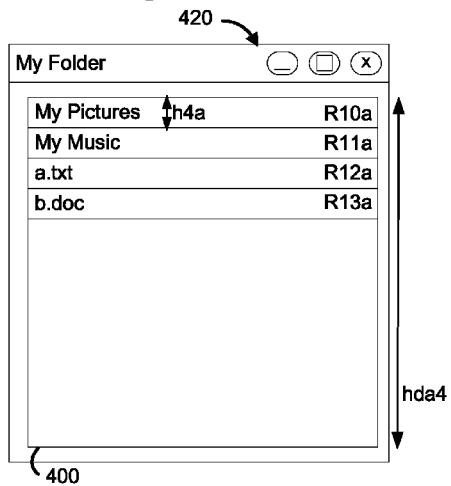
Fig. 4A
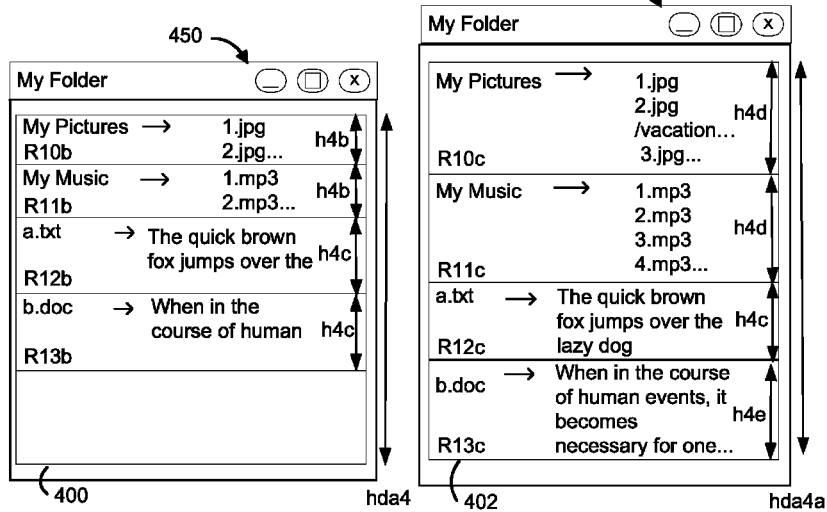
Fig. 4B
Fig. 4C

Fig. 6

| | Column1<br>(e.g., name) | Column2<br>(e.g., phone) | Column3<br>(e.g., image) | |
|---|---|---|---|---|
| Row1 (entry1) | Data field(1,1) | Data field(1,2) | Data field(1,3) | |
| Row2 (entry2) | Data field(2,1) | Data field(2,2) | Data field(2,3) | ... |
| Row3 (entry3) | Data field(3,1) | Data field(3,2) | Data field(3,3) | |
| Row4 (entry 4) | Data field(4,1) | Data field(4,2) | Data field(4,3) | |

600

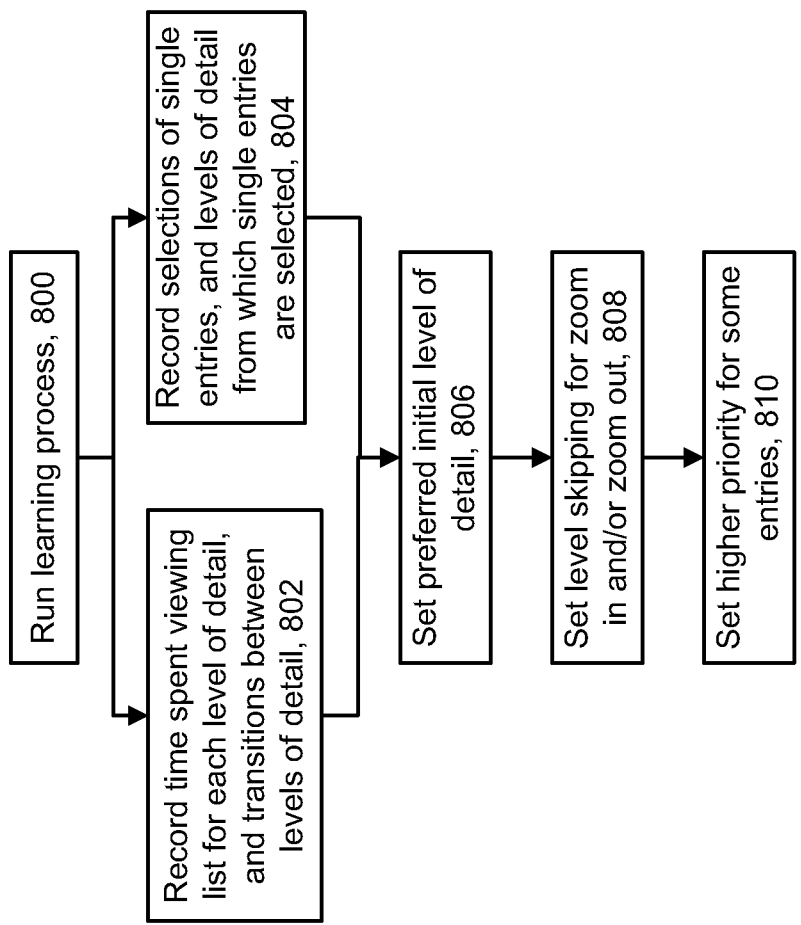

LIST CONTROL WITH ZOOM OPERATION

BACKGROUND

Modern computing devices provide user interfaces which present information to users in various formats. Typically, the screen size and the font size limit the amount of information which can be presented at a given time. Accordingly, some user interfaces allow the user to navigate among different views, such as to view more detailed information about a topic. Such user interfaces can be found on mobile devices, desktop or laptop computers and web interfaces, for example.

BRIEF SUMMARY

A system and method are disclosed which allow a user to conveniently view entries in a list at different levels of detail. The user can zoom in to view the entries with a higher level of detail, or zoom out to view the entries with a lower level of detail.

In one aspect, a method includes initiating execution of an application. The method further includes, in response to the initiating, accessing a plurality of entries, initializing a level of detail to use in a list in a display area comprising a number of regions, and using each region to display one of the entries in the list according to the level of detail. The method further includes, for each invocation by the user of a zoom in command of the application: increasing the level of detail with which the plurality of entries are displayed. Or, for each invocation by the user of a zoom out command of the application: decreasing the level of detail with which the plurality of entries is displayed.

BRIEF DESCRIPTION OF THE DRAWINGS

Aspects of the present disclosure are illustrated by way of example and are not limited by the accompanying figures with like references indicating like elements.

FIGS. 4A-4C depict example user interfaces which may be provided during window navigation in an operating system on a computing device.

FIG. 6 depicts an example database to which the disclosed technology can be applied to view the data in a database at varying levels of detail.

FIG. 8 is a flow chart depicting example details of the learning process of step 703 of FIG. 7.

DETAILED DESCRIPTION

Figure 1:
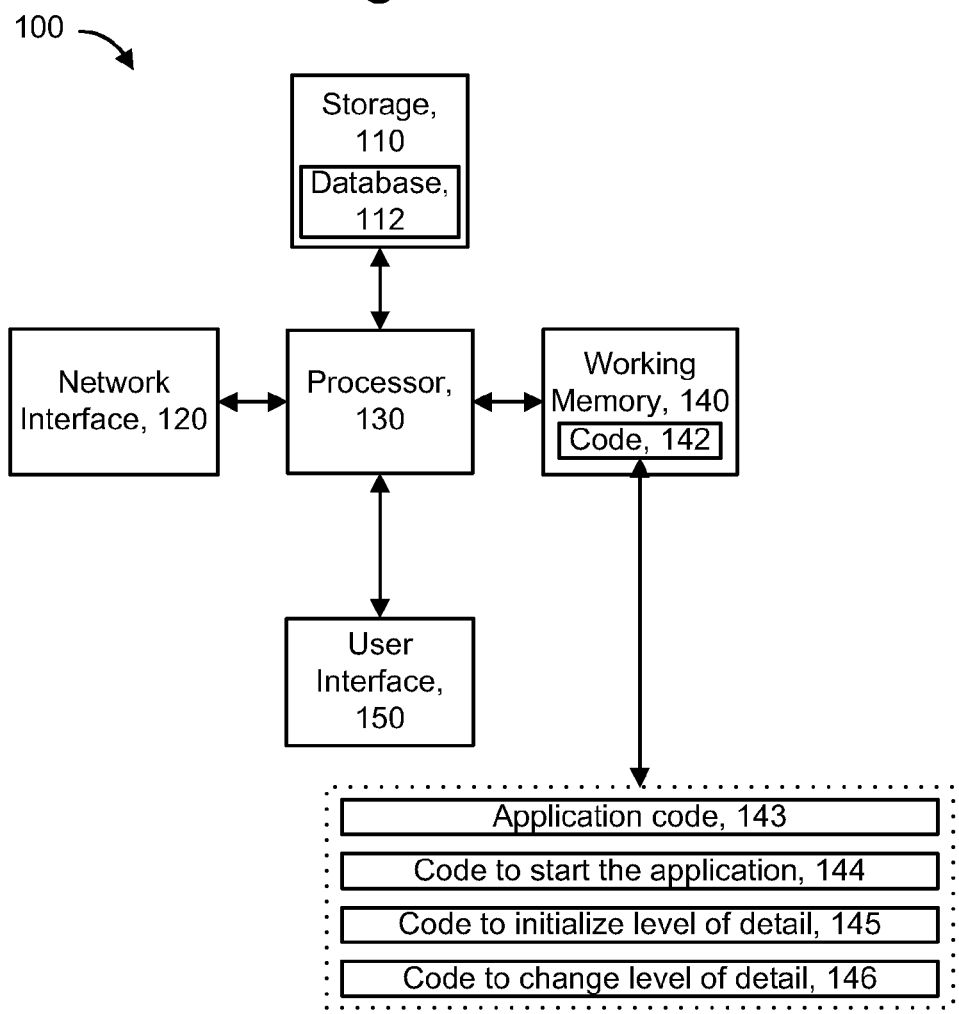
FIG. 1 depicts an example computing device.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or by combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

Aspects of the present disclosure are described herein with reference to flowchart illustrations and/or block diagrams of methods, apparatuses (systems) and computer program products according to embodiments of the disclosure. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As mentioned at the outset, various challenges are encountered in presenting information in a user interface due to screen size, font size and other limitations. In one scenario, information may be displayed as entries in a list. The entries can be complex data objects, having many viewable properties when selected for further viewing or manipulation. However, many details of the entries may be hidden when the list is initially presented. For example, the entries may have names which are initially presented in the list. The user may select an individual entry in the list to obtain more detailed information about that entry. In some cases, the more detailed view may use the entirety of the screen on which the list was displayed, hiding the other entries in the list. Moreover, the more detailed view may be too detailed and include data fields which are extraneous for the user's purposes and use valuable area on the screen that might otherwise be used more effectively.

The techniques provided herein address the above and other issues by providing a zoom in function and a zoom out function which allow the user to easily view and navigate through data in a convenient and efficient way. With these techniques, the user can view a collection of data which is presented in a list or similar format on a display, at various levels of detail. The zooming function can control the level of detail provided for the entries in the list. For example, when the user invokes a zoom in command, the system can provide greater details on the display for one or more entries in the list. Then, when the user invokes a zoom out command, the system returns to the original presentation or some other previous presentation of the list, with fewer details of the entries. In some embodiments, the user can invoke the zoom in or zoom out command multiple times, where each invocation of the command results in the system displaying the entries in the list at progressively higher or lower levels of detail. The disclosed technology can be implemented at the level of a user interface control, such that higher level applications can leverage the disclosed technology to manage how data corresponding to entries in a list is displayed.

FIG. 1 depicts an example computing device on which the disclosed technology may be practiced. The computing device 100 is a simplified representation of a system which can represent any client computing device or server, for instance. The computing device 100 can take the form of a personal computer (PC) such as a desktop or laptop computer, a personal digital assistant, a cellular telephone such as a smart phone, a tablet, or other known computing device. The computing device 100 includes a storage device 110, a network interface 120 for communicating with other computing devices, a processor 130 for executing code (e.g., software instructions/modules), a working memory 140 such as RAM for storing the code 142 after it is loaded from the storage device 110, for instance, and a user interface 150. The code can include, e.g., application code 143, code to start the application 144, code to initialize a level of detail 145 and code to change the level of detail 146. The storage device 110 or working memory 140 may be considered to be a tangible, non-transitory processor- or computer-readable storage device, apparatus or product having processor readable code embodied thereon for programming the processor 130 to perform methods for providing the functionality discussed herein.

A database 112 can be provided in the storage device 110. The user interface 150 can include a display to provide information to a human user, and an input device such as a keyboard, mouse or other pointing device, or voice command module, for receiving inputs/commands from a human user. The database 112 can include information such as entries comprising data fields, as described further, e.g., in connection with FIG. 6.

Figure 2:
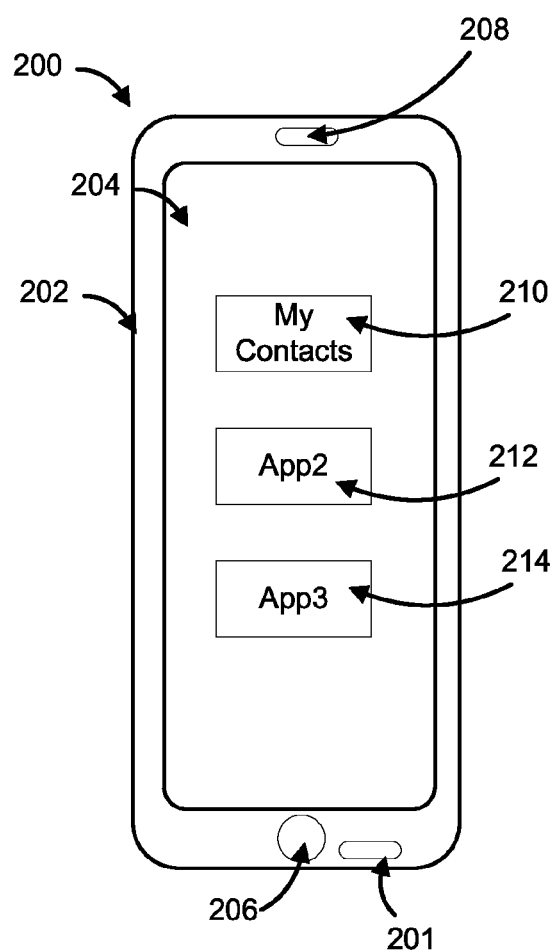
FIG. 2 depicts the example computing device of FIG. 1 in the form of a smart phone.

FIG. 2 depicts the example computing device of FIG. 1 in the form of a smart phone. While a mobile device such as a smart phone is depicted, as mentioned, other computing devices may be used to practice the disclosed technology, such as desktop computers, laptop computers, head-worn devices, tablet computers and so forth.

The smart phone 200 includes an outer surface 202 encasing electronic components within the phone. A display screen 204 can be a touch-screen display that responds to touch commands made by one or more fingers of a user. A button 206 is an example of a physical switch which the user can activate to issue commands to the smart phone. A microphone 201 and speaker 208 may also be provided.

The display screen 204 may include buttons, icons or other interface control elements which are used to launch applications. An application may initiate execution in response to a user touching an element such as a button, for instance. For example, an element 210 is used to launch a "My Contacts" application to access contact information and communicate with other persons. Similarly, elements 212 and 214 are buttons which are used to launch applications "App2" and "App3," respectively. An application could alternatively be launched by a user by voice command, physical buttons, gestures and so forth. In some case, an application can be launched automatically, without user intervention, such as upon startup of the operating system of the phone or other computing device.

Figure 3:
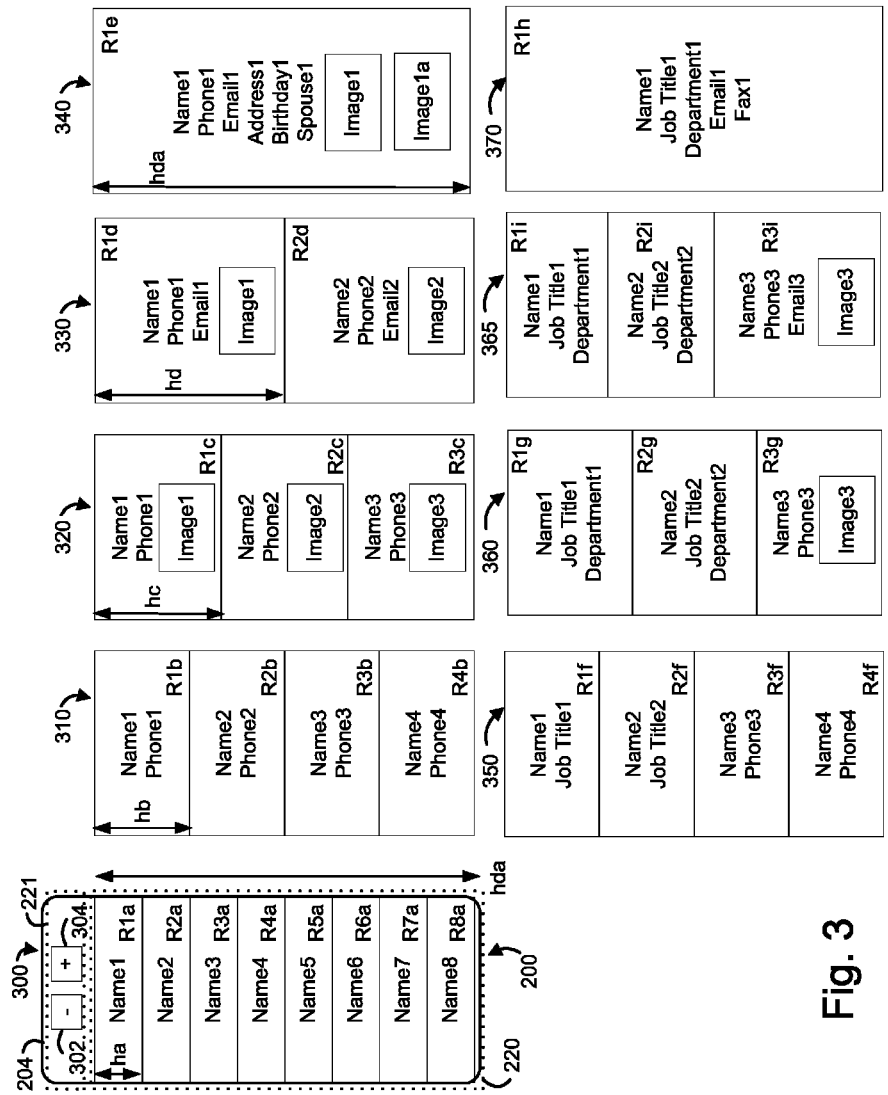
FIG. 3 depicts example user interfaces which may be provided on the smart phone of FIG. 2.

FIG. 3 depicts example user interfaces which may be provided on the smart phone of FIG. 2. The user interfaces may be accessed as part of the "My Contacts" application of FIG. 2. Any of example user interfaces 300, 310, 320, 330, 340, 350, 360, 365 and 370 can be presented on the display screen 204 of the phone 200. The display screen 204 includes a display area 220 which displays entries from the application, and a display area 221 which displays buttons 302 (−) and 304 (+) which allow the user to invoke an instance of a zoom out or zoom in command, respectively, to modify a level of detail in which the entries are displayed in the display area 220.

In some embodiments, zooming commands can be invoked by voice commands, by gestures involving display screen 204, or by other user interface techniques known in the art. For example, the user may invoke a zoom in or zoom out command by touching the screen. In one possible approach, the user touches the screen with two fingers and then moves the fingers apart or closer together on the screen to invoke a zoom in or zoom out command, respectively. In another possible approach, the user taps on the screen, swipes a finger across the screen or performs some other finger based gesture to invoke a zoom in or zoom out command. In another approach, the user can activate a slider or dial tool to change the level of detail.

Also, from any level of detail, the user can select one of the entries (contacts) in the list to view the entry by itself at the highest level of detail and using the full display area. The user thus has the convenience of viewing the entries at different levels of detail while being able to select a single entry.

In one approach, the user interface 300 shows a scrollable list of contacts from the contacts application in the display area, which has a height of hda. Within the display area are eight regions R1$a$-R8$a$, for instance. Generally, the user interface 300 provides a number of regions for the entries at a lowest level of detail. The number of regions which can be display at a time is based on the size of the display area and readability considerations. More or fewer regions may be presented. Each region shows data from an entry in the list of contacts. The entries may be displayed with one level of detail which is selected from among multiple levels of details.

The list may be a scrollable list which allows more entries to be viewed in the display area in response to a scroll command made by the user, e.g., by swiping a finger across the display area. For example, the user may swipe in the downward or upward direction to scroll the list downward or upward, respectively. The scrolling speed can be based on the extent of the swipe and/or a speed of the swipe. In the user interface 300, only the name for each contact in the list is presented, as one line of text. The name is an example of a data field for an entry. For example, Name1-Name8 are provided in regions R1$a$-R8$a$, respectively. This can be the first and last name of a contact, for instance. An entry can have many associated data fields which can be selectively accessed and displayed, such as name, phone number, image, email address, web site, mailing address, birthday, name of spouse and so forth. Typically, this is information which the user has previously input to the application and stored in a non-volatile memory of the phone. Thus, when the contacts application is executed, the application can access a number of entries which have predefined data fields. The number of data fields and the particular data fields which are displayed, can vary based on a parameter which defines a current level of detail.

In this example, each region has a same height, ha. In other embodiments, the height may vary from region to region. Typically, a scrollable list scrolls in the vertical direction. However, scrolling in the horizontal direction or other direction is also possible.

With a scrollable list, additional entries which are not currently visible in the display area can be viewed by scrolling the list. For example, assuming there are N entries, additional entries of Name9-NameN can be viewed in the display area by scrolling down the list. The scrolling can occur in increments of one or more entries. For example, when scrolling down the user interface 300 by one entry, Name2-Name9 would be displayed. When scrolling down the user interface 300 by another entry, Name3-Name10 would be displayed. The scrolling could alternatively occur in a larger increments such that Name1-Name8 were replaced by Name9-Name17, for instance. This can be considered to be a page by pad scrolling since all new entries are displayed with each scrolling increment.

User interface 310 can be provided in place of the user interface 300 after the user has invoked the zoom in command. In one approach, the level of detail increases by one level with each invocation of the zoom in command and decreases by one level with each invocation of the zoom out command. Maximum and minimum levels of detail can be defined as well which limit the zooming in and out, respectively. The display area 221 is not depicted for simplicity.

In user interface 310, the first four entries in the contacts list from user interface 300 are presented in greater detail. Specifically, regions R1$a$-R4$a$ are provided as regions R1$b$-R4$b$, respectively. R1$b$ includes data fields Name1 and Phone1, R2$b$ includes data fields Name2 and Phone2, R3$b$ includes data fields Name3 and Phone3, and R4$b$ includes data fields Name4 and Phone4. In this case, two data fields are provided for each entry on two lines of text. Thus, a number of the data fields displayed for each region can increase after each invocation of the zoom in command.

In one embodiment, the height of the display area (hda) is the same in the different user interfaces. However, the height of each region (hb) in the user interface 310 is greater than that of each region in the user interface 310 to make room for the additional line of text used for the phone numbers. The height of each region can increase, while the number of regions which are visible at a given time in the display decreases, as the level of detail increases. Conversely, the height of each region can decrease, while the number of regions which are visible at a given time in the display increases, as the level of detail decreases.

Alternatively, all eight entries from the user interface 300 could be provided with the increased level of detail in the user interface 310, if their data fields (e.g., names and phone numbers) were presented in a smaller font to properly fit the display area. In another embodiment, the display area could be resized (e.g., increased in size) compared to the user interface 300, if possible, to legibly present the information from all eight entries in the user interface 310. The order of the entries may be preserved in the different user interfaces as the level of detail changes. The order may be alphabetical by first or last name, for instance.

When scrolling the user interface 310 by one scrolling increment, in one approach, entries associated with Name2-Name5 can be viewed in the display area in place of entries associated with Names1-Name4.

User interface 300 may be reached from user interface 310 by invoking a zoom out command.

User interface 320 may be reached from user interface 310 after the user has invoked another instance of the zoom in command. In some embodiments, user interface 320 may also be reached directly from the user interface 300 by a single invocation of the zoom in command, without displaying the user interface 310. This may occur when the level of detail of user interface 310 is skipped, for instance, using a feature called level skipping, described further below. Moreover, user interface 310 or 300 may be obtained by invoking the zoom out command from user interface 320. User interface 320 presents the first three entries at a next higher level of detail compared to the user interface 310, such that an additional data field which represents an image is displayed. For example, the image may be a thumbnail image of the face of a person associated with the contact. The data fields which were provided at the lower level of detail, namely the names and phone numbers of the contacts, are also included at the higher level of detail, in this example.

In user interface 320, regions R1c-R3c correspond to the regions R1b-R3b, respectively. Region R1c includes data fields Name1, Phone1 and Image1, R2c includes data fields Name2, Phone2 and Image2, and R3c includes data fields Name3, Phone3 and Image3. Thus, three data fields are displayed per entry. Moreover, some data fields can comprise text or numbers (alphanumeric data) while other data fields comprise other types of data such as image data (e.g., still images, video or animations). The image data may consume an amount of space which is equivalent to more than one line of text. Thus, a portion of the display area which is allocated to each data fields can be different according to characteristics of the data field.

To fit this additional information, the height of the regions is increased to hc. Because these regions are higher but the display area is fixed, only three regions are presented on user interface 320 instead of the four regions of user interface 310. As before, the other contacts may be viewed at the same level of detail as in R1c-R3c by scrolling the list.

Optionally, the list spans an increasing height of the display area after each invocation of the zoom in command.

In these example, a plurality of data fields comprise image data of different persons (e.g., images) and text data of the different persons (e.g., name and phone numbers). The level of detail is initialized to a level in which the text data is displayed in the regions but the image data is not displayed in the regions (e.g., as in user interface 300 or 310), and the level of detail is increased to a level in which the text data and the image data are displayed in the regions (e.g., as in user interface 320).

As a further example, user interface 330 may replace the user interface 320 after the user has again invoked the zoom in command. In some embodiments, user interface 330 may also be reached directly from any of the user interfaces 300, 310 and 320 by invoking the zoom in command. Similarly, user interfaces 320, 310 or 300 may be reached by invoking the zoom out command from user interface 330.

In user interface 330, regions R1d and R2d correspond to the regions R1c and R2c, respectively. Region R1d includes data fields Name1, Phone1, Email1 and Image1, and R2d includes data fields Name2, Phone2, Email2 and Image2. Thus, four data fields are provided per entry. In this example, the order in which the data fields appear in each region is different than the order in which the data fields are added as the level of detail increases (since Email1 and Email2 are displayed before Image1 and Image2, respectively). In other cases, the order in which the data fields appear in each region is the same as the order in which the data fields are added as the level of detail increases (such as in user interfaces 310 and 320).

Thus, user interface 330 presents the first two entries of the prior user interfaces at an even greater level of detail by providing an email address. To fit this additional information, the height of the regions is further increased, to hd. Because these regions are higher and the display area is fixed, in one approach, only two regions are presented on user interface 330 instead of the three of user interface 320. The other entries may be viewed at the same level of detail by scrolling the list.

User interface 340 shows how user interface 330 transforms after the user has invoked a further zoom in command. In some embodiments, user interface 340 may also be reached directly from user interfaces 300, 310, 320 or 330 by invoking the zoom in command. User interfaces 330, 320, 310 or 300 may be obtained by successive invocations of the zoom out command from user interface 340. User interface 340 could also be reached directly from any of the other user interface by the user selecting the entry for the contact.

In user interface 340, region R1e corresponds to the region R1d. Region R1e includes data fields Name1, Phone1, Email1, Address1 (a mailing address), Birthday1, Spouse1, Image1 and Image2. Thus, eight data fields are provided per entry.

User interface 340 presents the first contact at a highest level of detail by providing a home address, birthday, spouse's name, and an additional image of the contact along with the information from R1d. To fit this additional information, the region in which this contact is presented takes up substantially the entirety of the display area.

Generally, the list provided in the various user interfaces is a scrollable list and spans a fixed height of the display area after each invocation of the zoom in or zoom out command, and the number of regions in the display area is increased or decreased after each invocation of the zoom out or zoom in command, respectively.

The other contacts may be viewed at the same level of detail by scrolling the list. In one approach, the user is allowed to scroll the list regardless of whether the user interface 340 was reached by the zoom in command or by selection of a single entry.

In one embodiment, one or more additional data fields are displayed with each higher level of detail. For example, the email address is made available in the user interface 330 following the user interface 320. In another embodiment, one or more additional data fields are displayed in place of one or more other data fields with each higher level of detail. For example, the email address could be made available in place of the image in the user interface 330, following the user interface 320.

Generally, the various data fields of an entry can be each assigned a priority, and the display of the data fields can be based on the priority at each level of detail. Each level of detail may be associated with a priority threshold such that only data fields whose priority meets or exceeds the threshold are displayed. If the priority of a first data field but not a second data field exceed a first threshold for a given level of detail, this first data field but not the second data field may be displayed. Subsequently, with another invocation of a zoom in command, the threshold is lowered such that the second data field is also displayed. Moreover, the order in which the data fields are displayed can be based on their relative priorities.

User interfaces 350, 360, 365 and 370 show another possible sequence of transformations of user interface 300 that can be obtained via zoom in commands. This example shows that entries can be classified. For example, the contacts can be classified as professional (e.g., work related) contacts or personal contacts. The presentation of the data fields for an entry depends on the category, for one or more of the levels of detail. For example, user interface 350 provides a name and job title (e.g., manager, technician) for two entries for professional contacts in regions R1f and R2f, and a name and phone number for two entries for personal contacts in regions R3f and R4f. The zoom in and zoom out commands can result in displaying different data fields for different entries according to the categories based on settings in software, including default settings, or settings by the user.

Specifically, in user interface 350, regions R1f-R4f correspond to the regions R1a-R4a, respectively. R1f includes data fields Name1 and Job Title1, R2f includes data fields Name2 and Job Title2, R3f includes data fields Name3 and Phone3, and R4f includes data fields Name3 and Phone4. Thus, two data fields are provided per entry. It is also possible to provide different number of data fields per entry according to the classification of the entry, at a given level of detail. For example, three data fields may be provided for a professional contact and two data fields may be provided for a personal contact. In another approach, entries have respective priorities within a category. For example, in the category of personal contacts, family members and close friend may have a higher priority than casual acquaintances. Additional data fields can be displayed when the priority of the entry is higher, at a given level of detail, for instance.

In user interface 360 (obtained by zooming in from user interfaces 300 or 350), additional information is presented for the first three contacts. Since the first two contacts are professional contacts, further work-related information such as the departments in which the contacts work (e.g., human resources, engineering) is listed along with the names and job titles listed in user interface 350. For the third contact, who is a personal contact, a thumbnail image is listed along with the name and phone number.

Specifically, in user interface 360, regions R1g-R3g corresponds to the regions R1f-R3f, respectively. R1g includes data fields Name1, Job Title1 and Department1, R2g includes data fields Name2, Job Title2 and Department2, and R3g includes data fields Name3, Phone3 and Image3.

The transition from user interface 300 to user interface 350 is an example in which entries of the plurality of entries are classified into a category from among a plurality of categories (e.g., professional, personal) and comprises a data field independent of the category (e.g., name) and a data field dependent on the category (e.g., job title for professional and image for personal). Further, for at least one invocation by the user of the zoom in command of the application, the increasing the level of detail with which the plurality of entries are displayed comprises transitioning from displaying the entries with the data field independent of the category but not the data field dependent on the category (e.g., user interface 300), to displaying the entries with the data field independent of the category and the data field dependent on the category (e.g., user interface 350).

User interface 365 is an alternative to user interface 360, and displays the personal contact (in region R3i) with a higher level of detail compared to the professional contacts (in regions R1i and R2i), e.g., by displaying an additional number of data fields (e.g., 4 vs. 3). Regions R1i, R2i and R3i correspond to R1g, R2g and R3g, respectively. Further, the height of R3i is greater than a height of R1i and R3i. This is an example in which entries of the plurality of entries are classified into a category from among a plurality of categories. Further, for at least one invocation by the user of the zoom in command of the application, the increasing the level of detail with which the plurality of entries are displayed comprises transitioning from displaying the entries where the height of the regions is common (e.g., as in user interface 360), to displaying the entries where the heights of the regions vary with the categories (e.g., as in user interface 365). Further, the heights of the regions vary with the relative priorities of the categories.

Further, as mentioned, the user can select a single entry or can zoom in to the point where a single entry is displayed in the display area. For example, on display screen 204, a user can touch the region associated with an entry of interest to select this entry to cause it to be displayed by itself at the highest level of detail (without invoking an additional zoom in command). In another approach, the user selects a single entry and then presses the button 304 to invoke the zoom in command, to cause the entry to be displayed by itself at the highest level of detail. For example, the user interface 370 can be reached when the user selects the first contact in the user interface 360, such as by touching a finger over R1g. User interface 370 includes a region R1h corresponding to R1g, and presents information only for the selected contact using the full display area. Since the first contact is a professional contact, the user interface 370 presents additional work related information such as an email address and fax number in addition to the data fields presented in user interface 360. Specifically, in user interface 370, region R1h correspond to R1g and includes data fields Name1, Job Title1, Department1, Email1 and Fax1.

In contrast, the user interface 340, discussed previously, can be reached when the user selects the third contact in the user interface 360, such as by touching a finger over R3g. The additional information which is displayed is based on the entry being for a personal contact.

The technology disclosed herein can take advantage of location-detecting components in a computing device. For instance, many smart phones are equipped with a location-detecting device such as GPS. Location information can also be detected through other wireless signals such as from Wi-Fi and cell phone networks. In some embodiments, the disclosed technology can use location information to decide how to present information to the user. For instance, still referring to FIG. 3, the user interfaces might only provide additional information for contacts within a certain distance of the user's location. In some embodiments, the user's smart phone alerts the nearby contacts of the user's presence and/or location. In another example, if the user is in an office location, the user interfaces might only display professional contacts, or may display professional contacts before personal contacts.

Many smart phones are also equipped with sensors such as accelerometers. In some embodiments, the user can invoke zoom in or zoom out commands by moving or positioning the smart phone in a specified way, wherein the accelerometers or other sensors detect the movement or positioning. Circuits in the phone translate this movement or positioning into a command. For instance, each time the user shakes the smart phone, the user interface can provide a higher level of detail. Alternatively, rotating the smart phone in one direction might comprise a zoom in command, whereas rotating the smart phone in the other direction would comprise a zoom out command.

FIGS. 4A-4C depict example user interfaces which may be provided during window navigation in an operating system on a computing device. The window navigation is a part of a graphical user interface (GUI) of a file manager application for managing a file system on a computing device. The window navigation can allow the user to view files and to perform operations involving the files (e.g., opening, executing, renaming, copying, deleting and so forth). Popular operating systems for personal computers and other computing devices often include such a user interface.

FIG. 4A provides a window 420, which is a high level directory (also known as a folder or catalog), showing two folders (having folder names of "My Pictures" and "My Music") and two files (having file names of "a.txt" and "b.doc") stored in the high level directory. Each of these four entries is presented in its own region (regions R10a, R11a, R12a and R13a) of a display area 400 having a height hda4. In one embodiment, each of these regions is the same size (having a height h4a), and together, these regions occupy only part of the display area 400 of window 420. This window may be provided at the lowest level of detail.

In FIG. 4B, window 450 shows the same high level directory as window 420 but with additional data fields. This window may be provided at the next higher level of detail. Regions R10b-R13b correspond to regions R10a-R13a, respectively. Moreover, the height of each region is increased relative to FIG. 4A. For example, R10b and R11b have a height of h4b, and R12b and R13c have a height of h4c. This is an example of regions transitioning from having a same height at one level of detail, as in FIG. 4A, to having different heights at another level of detail, as in FIG. 4B, according to the type or category of the entry (e.g., folder vs. file).

Window 450 shows some of the files inside the folder My Pictures ("1.jpg" and "2.jpg") and inside the folder My Music ("1.mp3" and "2.mp3"). The ellipses following "2.jpg" and "2.mp3" indicate that the folders "My Pictures" and "My Music" contain more files and folders than the ones shown. Some or all of the additional files and folders may be made visible if the user invokes another zoom out command. Alternatively, these additional files and folders may not be made visible if zooming in further would make the filenames and associated details illegibly small. Window 450 also shows part of the contents of the text documents as a preview. For example, the files a.txt and b.doc both provide two lines of preview text. To fit this additional information, the regions in which the entries are shown have been expanded in height to occupy more of the display area. The user can reach window 450 from window 420 by zooming in, as described above. For example, on a PC keyboard and mouse with scroll wheel, a command such as "Ctrl+ALT"+mouse wheel up can be used for zooming in, and a command such as "Ctrl+ALT"+mouse wheel down can be used for zooming out.

FIG. 4C provides a window 480 which can be obtained by zooming in from windows 450 or 420. Regions R10c-R13c correspond to regions R10b-R13b, respectively. Moreover, the height of some of the regions is increased relative to FIG. 4B. For example, R10c and R11c have an increased height of h4d>h4b, R12c has the same height h4c as R12b and R13c has the increased height of h4e>h4c compared to R13b.

As explained above, the ellipses in the My Pictures and My Music folders of window 450 indicate that these folders have more files and folders than are displayed in window 450. In window 480, more of these files and folders are displayed. Namely the subfolder "/vacation . . . " and the additional file "3.jpg" are displayed under My Pictures and the additional files "3.mp3" and "4.mp3" are displayed under My Music. The ellipses that follow "/vacation" indicates that this item is a non-empty folder with other files and/or folders inside. The ellipses that follow "3.jpg" and "4.mp3" also indicate that the folders My Pictures and My Music have more files and folders that are not displayed in window 480.

Furthermore, the preview text shown in window 480 for a.txt and b.doc have been expanded to include additional lines of preview text. Specifically, three lines of preview text are provided in R12c and four lines of preview text are provided in R13c. The ellipses following the contents shown for b.doc indicate that b.doc includes more preview text that that shown in window 480. To fit the additional information for the entries displayed in window 480, the regions for the entries have been expanded to fit the entirety of the display area of the window 480. Additionally, the height of the display area 402 window 480 has been expanded (to hda4a>hda4) to accommodate the larger regions. In some embodiments, the font of the text in the display area can be reduced when zooming in to fit the additional information displayed, though the reduced font should still be legible to the user.

At the lowest level of detail (window 420), the entries associated with regions R12a and R13a comprise file names for files in a file manager application without preview text of the files. In the window 450, at the next higher level of detail, the file names and a preview with a first amount of preview text of the files (e.g., two lines of text) is displayed. In the window 480, at a further next higher level of detail, the file names and a second amount of preview text of the files (e.g., three lines of text), where the second amount is greater than the first amount.

Thus, zooming in and zooming out can be used to provide different levels of detail in a folder browsing system. Moreover, different levels of detail can be provided based on the zooming in or out. For example, since a.txt is a small file, window 480 is large enough to fit the contents of a.txt in R12c. In some embodiments, zooming in from window 480 might provide thumbnails of 1.jpg and 2.jpg next to the file names. The additional information provided by zooming in is not limited to text or still images. For example, if the files shown in a window are video files (e.g., .gif files), then in some embodiments, zooming in might show thumbnails of scenes in the video files. In some embodiments, zooming in might show metadata about the files and folders displayed, such as the sizes of those files and folders and when those files and folders were modified. In some embodiments, if the user selects or highlights one or more of the files or folders in window 420 before invoking a zoom in command, then in window 480, the higher level of detail may only be provided for those selected or highlighted files or folders. In some embodiments, if window 480 is not maximized to fit the entirety of the screen on which the windows are displayed, then zooming in from window 480 might result in enlarging the window, the font size and/or providing a greater level of detail regarding the displayed information.

Figure 5A:
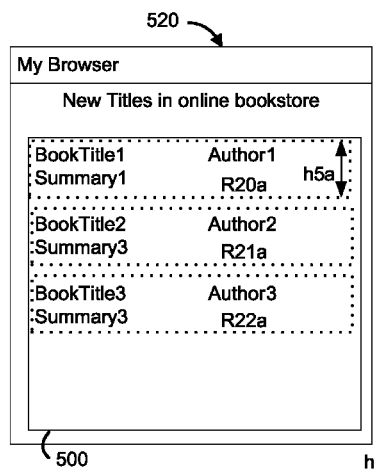
FIGS. 5A-5C depict example user interfaces which may be provided when presenting data fields of data objects in a web browser.
Figure 5C:
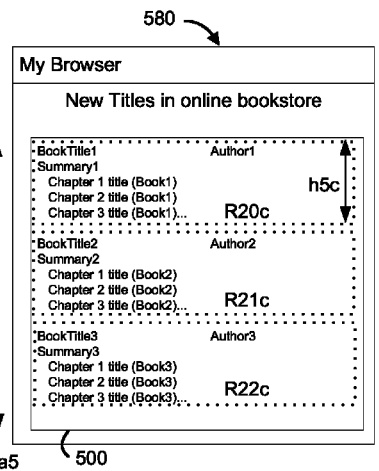
Figure 5B:
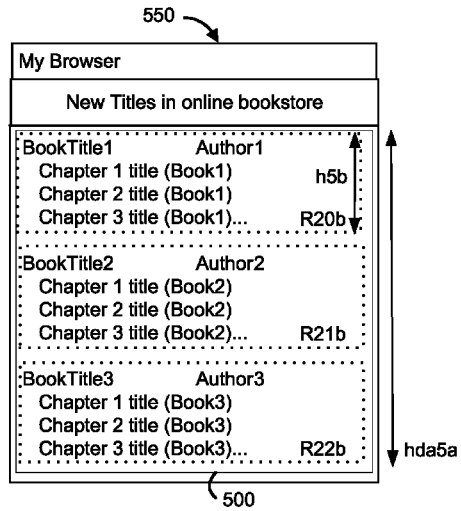

FIGS. 5A-5C depict example user interfaces which may be provided when presenting data fields of data objects in a web browser. In FIG. 5A, window 520 having a height hda5 shows information concerning "New Titles" being sold at an online bookstore in a display area 500. The display area includes regions R20a, R21a and R22a, each having a height h5a. Each region provide data fields of an entry. For each entry, the information provided comprises data fields with the title of the book, the author of the book, and a summary of the book. For example, R20a includes the data fields BookTitle1, Author1 and Summary1. R21a includes the data fields BookTitle2, Author2 and Summary2. R22a includes the data fields BookTitle3, Author3 and Summary3. The online bookstore may provide a limited amount of content from a book to provide a potential purchaser with an idea of what the book is about.

Window 550 in FIG. 5B, can be obtained from zooming in from window 520, and window 520 can be obtained from window 550 by zooming out from window 550. The zoom in and zoom out commands in a web browser may be similar to those discussed previously. Window 550 includes regions R20b, R21b and R22b, each with a height h5b>h5a, corresponding to regions R20a, R21a and R22a, respectively. Window 550 shows chapter titles in place of the summaries, for the first three chapters of each book. For example, R20b includes the data fields BookTitle1, Author1, Chapter 1 title (Book1), Chapter 2 title (Book1), and Chapter 3 title (Book1). R21b includes the data fields BookTitle2, Author2, Chapter 1 title (Book2), Chapter 2 title (Book2), and Chapter 3 title (Book2). R22b includes the data fields BookTitle3, Author3, Chapter 1 title (Book3), Chapter 2 title (Book3), and Chapter 3 title (Book3).

FIG. 5C provides a window 580 which can be reached by zooming in from window 520 or 550. Window 580 displays the data fields of window 550 in addition to the summaries of the books from window 520 in regions R20c, R21c and R22c. For example, R20c includes the data fields of R20b in addition to Summary1. R21c includes the data fields of R21b in addition to Summary2. R22c includes the data fields of R22b in addition to Summary3. Window 580 may be display as a next higher level of detail from window 520 or 550. The transition from window 520 to window 580 is an example of displaying an additional data field (chapter titles), along with previously displayed data fields, as the level of detail increases. In contrast, the transition from window 520 to window 550 is an example of displaying an additional data field (chapter titles) in place of a previously displayed data field (summaries) as the level of detail increases.

As mentioned, the data fields can have respective priorities, and a minimum threshold (or range of priority thresholds) can be associated with each level of detail. Data fields having a priority which meets or exceeds a current minimum threshold (or is within a current range of thresholds) can be displayed at each level of detail. For example, assume window 520 represents the lowest level of detail and there are priority levels of 1, 2, 3 and 4 for the data fields of book title, author, summary and chapter titles, respectively (where 1 is the highest priority and 4 is the lowest). An initial priority threshold may be set to 3, so that the data fields with priority of 1-3 are displayed in window 520. This is an example of providing a data object (e.g., an entry providing data regarding a book) comprising a plurality of data fields, associating a priority with each of the data fields, selecting a data field from among the plurality of data fields for which the priority meets or exceeds an initial threshold (e.g., priority 3, which is met or exceeded by priorities 1, 2 or 3), and displaying the data field for which the priority meets or exceeds the threshold on the display area.

Subsequently, the level of detail is increased by one level, such that a reduced priority threshold of 4 (which is met or exceeded by priorities 1, 2, 3 or 4) is set, and the data fields with priority of 1-4 are displayed in window 580. This is an example of, in response to each invocation by a user of a zoom in command: selecting a data field from among the plurality of data fields for which the priority meets or exceeds a reduced threshold (e.g., 4), below the initial threshold, and displaying the data field for which the priority meets or exceeds the reduced threshold on the display area. In this case, the data field for which the priority meets or exceeds the initial threshold (e.g., any of book title, author and summary) is displayed in the display area concurrently with the data field (e.g., chapter titles) for which the priority meets or exceeds the reduced threshold.

Optionally, when there is a transition from window 520 to window 550, the data field (e.g., chapter titles) for which the priority meets or exceeds the reduced threshold is displayed in the display area in place of the data field (e.g., summary) for which the priority meets or exceeds the initial threshold. Further, the data field (e.g., chapter titles) for which the priority meets or exceeds the reduced threshold may comprise more lines of text (e.g., three lines, one for each of the first three chapters) than the data field (e.g., summary) for which the priority meets or exceeds the initial threshold. This example assumes fewer lines of text are used in the display region for the summary than for the chapter titles. Thus, not only can invoking a zoom in command show more information (e.g., additional data fields) in a list structure, but in some cases such as the transition from window 520 to window 550, invoking the zoom in command can replace data (e.g. replace summaries with chapter titles) in the list structure. A goal can be to facilitate the display of information.

To accommodate the space required by the text of the chapter titles, the height of the display area may be increased, as shown for window 550 having height hda5a>hda5.

Moreover, the additional information shown in window 550 or 580 that is not shown in window 520 can be retrieved by the system from a data source. In one example implementation, the system displaying window 520 is a kiosk, web browser or desktop station being used by a user, and the data source is a database in a server belonging to the online bookstore. The application can initially provide the window 520. Upon the user invoking the zoom in command, the system queries the database to obtain the information necessary for window 550 or 580.

In some embodiments, zooming in from window 520 shows the information displayed in window 550 or 580, and in addition can show short biographies of the authors of the books. Further zooming in from a window can show additional information such as user reviews of the books featured in the window.

The font size can also be adjusted based on the zooming. For example, the font in window 580 is smaller than the font in window 520. Zooming in can reduce the font size in a window (or "Contacts" list) to make space for the additional information presented for each entry. Zooming out might increase the font size since less information is presented for each entry. In some embodiments, the user is prevented from zooming in beyond a certain point at which adding any further information would require making the font in the window illegibly small.

Another possible zoom in sequence is from window 520 to window 550 to window 580. This is an example of a data field (e.g., summaries) being removed when the level of detail is increased and being returned when the level of detail is further increased. As mentioned, unlike windows 520 and 550, window 580 shows both summaries and chapter titles of the books, in addition to the book titles and author names.

FIG. 6 depicts an example database to which the disclosed technology can be applied to view the data in a database at varying levels of detail. The various user interfaces and windows described herein can be implemented using a database table 600, in one example approach. A database can store data fields in a table comprising rows and columns. Each data field can be accessed based on a (row, column) address.

For instance, for a contacts application, each row may represent an entry for a respective person while each data field provides an associated attribute. Optionally, the order of the columns indicates a priority of the data fields. For example, row 1 may be used for a first contact entry, data field(1,1) may be the name (e.g., Name1), data field(1,2) may be the phone number (e.g., Phone1), data field(1,3) may be the image (e.g., Image1) and so forth. Similarly, the other rows may provide corresponding data fields for the other entries. For each level of detail, specified data fields for an entry can be displayed by addressing one or more of the columns. For example, in FIG. 3, the user interface 300 may be displayed by selecting column 1, the user interface 310 may be displayed by also selecting column 2, and the user interface 320 may be displayed by also selecting column 3.

In another aspect, the disclosed technology can be applied to general database searches. Each data field may represent a record. Each record, as a data object, may in turn have multiple data fields, not all of which may be displayed at once. The columns of data initially displayed in response to a user's query may show the data fields with high priority or importance. Zooming in from a level of data presented in response to the query (by the user invoking the zoom in command) might result in presenting the user with an additional level of detail associated with the entries, as provided by the attributes associated with each record in the table. If the user invokes a sequence of zoom in commands, the user may be presented with more progressively more columns of data. Conversely, if the user invokes a zoom out command, then the user is presented with progressively fewer columns of data, undoing a previous invocation of a zoom in command.

Figure 7:
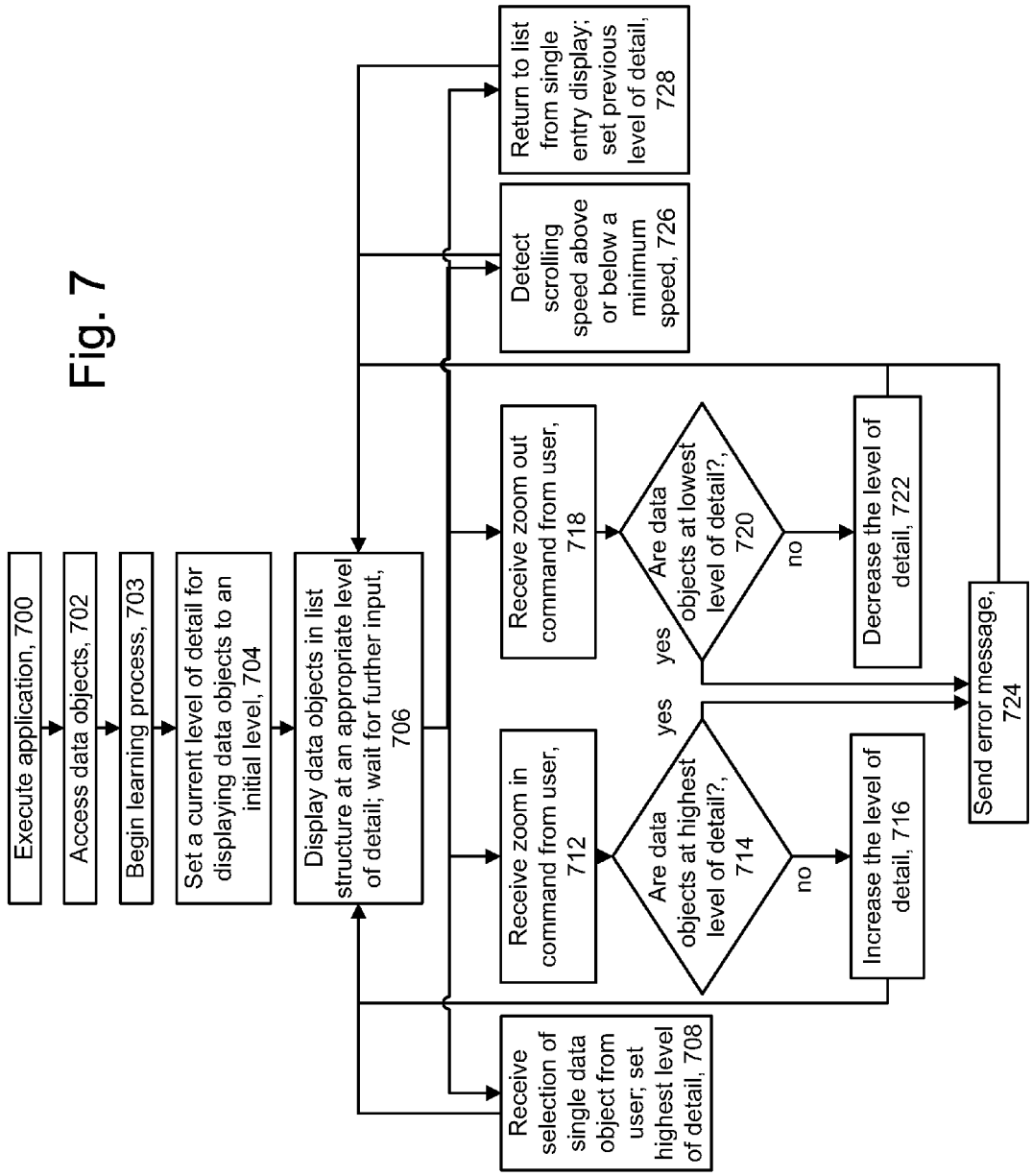
FIG. 7 is a flow chart depicting an exemplary process according to the disclosed technology.

FIG. 7 is a flow chart depicting an exemplary process according to the disclosed technology. The process can be implemented by software and/or hardware on a computing device such as shown in FIG. 1. At step 700, the application begins execution, e.g., automatically or based on a user command. At step 702, the application accesses data objects, such as by reading in the data objects to a working memory from a non-volatile memory. Step 703 begins an optional learning process, discussed further in connection with FIG. 8. Step 704 sets a current level of detail for displaying data objects (e.g., entries) to an initial level. Step 706 displays the data objects in a list structure at an appropriate level of detail (e.g., the current level of detail) and waits for further input from the user. In some cases, the initial level of detail is the lowest available level and the entries are initially displayed at this level. However, it is possible for the initial level of detail to be higher, e.g., based on learning preferences of the user, based on a user setting, or based on a default setting.

Subsequently, one of several paths can be followed. In one path, step 708 receives a selection of a single data object from the user, and the highest level of detail is set. In response, step 706 is followed, and the single entry may be displayed at the highest level of detail. In another path, step 712 receives a zoom in command from the user. In response, decision step 714 determines if the data objects are at the highest level of detail. If decision step 714 is true, step 724 may send an error message via the user interface, such as an on-screen message and tone that informs the user that no further zoom in is possible. If decision step 714 is false, step 716 increases the level of detail. In one approach, the level of detail can be maintained as an integer parameter which ranges between a minimum and maximum level. Increasing or decreasing the level of detail can involve increasing or decreasing the value of the parameter.

Nominally, the level of detail can be increased by one level for each invocation of the zoom in command. However, this could vary based on the learning process, where it is learned that the user prefers to skip over one or more levels. Subsequently, step 706 is reached and the data objects are displayed at the increased level of detail.

In another path, step 718 receives a zoom out command from the user. In response, decision step 720 determines if the data objects are at the lowest level of detail. If decision step 720 is true, step 724 may send an error message via the user interface, such as an on-screen message and tone that informs the user that no further zoom out is possible. If decision step 720 is false, step 722 decreases the level of detail. Nominally, the level of detail can be decreased by one level for each invocation of the zoom out command. However, this could vary based on the learning process. Subsequently, step 706 is reached and the data objects are displayed at the decreased level of detail.

In another path, step 726 detects a scrolling speed of a scrollable list being above or below a minimum speed. Optionally, the level of detail can change automatically in response to the scrolling speed. For example, the level of detail could revert to a lower level during scrolling, so that the regions will have a smaller height. More regions may be viewed at a time in the display area, thereby speeding and facilitating scrolling. In another option, when the user completes scrolling, the level of detail can automatically revert to the level which was active before scrolling. The minimum speed can be set to a non-zero value (e.g., in terms of a number of additional entries or regions which become viewable per second) so that a slow speed of scrolling does not change the level of detail, while a faster speed of scrolling does change the level of detail. Subsequently, step 706 is reached and the data objects are displayed at the decreased level of detail.

In another path, step 728 returns to the list from a single entry display (following step 708) and sets a previous level of detail. For example, the user can invoke a "return" command by a finger swipe on the touch screen, by clicking a back arrow or by other means.

In step 706, the system displays data objects in a list structure or format. As described above, the data objects can include (but are not limited to) entries in a "Contacts" list, files and folders in a computer directory, information regarding books or other items to be sold in an online store, and entries in a database. After displaying the data objects, the system waits for the user to invoke a command or take some other action.

Concurrently with any step in the process of FIG. 7, the system can respond to user commands other than the zoom in or zoom out commands, and the system can also perform other processes.

In some embodiments, the system can queue commands invoked by the user through user interface 150 up to a certain amount of time and detect whether a signature of a command in the queue matches the signature of a zoom in or out command.

To obtain the information required to provide the various levels of detail, the system can retrieve attributes about the displayed data objects from one or more data sources. Possible data sources include (but are not limited to) working memory 140, storage 110, database 112, or the "Cloud," as accessed by network interface 120.

The process depicted in FIG. 7 can be programmed into software controlling the operation of the computing device 100 in FIG. 1. In such a configuration, a higher level application, such as an application for using a contacts list, can call upon the process to manipulate data presented in a list or similar format. Details about the application such as what information is displayed, at what level of detail that information is displayed, and the position of the information on the user interface, can be decided by a developer of the application. The developer might also make such details subject to modification by a user. In some embodiments, the number of levels of detail available is a function of the size of the hardware display on which the data objects are shown, such that a user can invoke zoom in commands for zooming in further if the display is able to legibly fit the additional information obtained by zooming in.

FIG. 8 is a flow chart depicting example details of the learning process of step 703 of FIG. 7. Step 800 involves running the learning process. As an example, this can involve different processes which can be performed in parallel. For example, step 802 involves recording an amount of time spent viewing a list for each level of detail, and transitions between levels of detail. This can indicate that the user prefers to view the list at one or more specific levels of detail and is less interested in viewing the list at one or more other levels of detail. This information can be used, e.g., to set the preferred initial level of detail to the level of detail which is most commonly used by the user. Further, this information can indicate that it would be efficient for the user interface to skip a display at one or more levels of detail which the user does not frequently use, when transitioning between displays with commonly used levels of detail.

Step 804 involves recording selections of single entries, and levels of detail from which the single entries are selected.

As mentioned, the user can select a single entry to view alone with the highest level of detail, from any of the user interfaces below the highest level of detail. This might indicate, e.g., that one of the lower levels of detail which is commonly used to select a single entry should be set as the initial level of detail.

Moreover, single entries which are commonly selected could be given a higher priority than other entries. Based on this higher priority, these entries could be, e.g., displayed with a higher level of detail. For instance, when the level of detail is at a certain level, the higher priority entries could be displayed with a level of detail at the next higher level. For instance, in FIG. 3, the user interface 310 could be modified by replacing region R1b (with data fields Name1 and Phone1), for instance, with R1c, when the corresponding entry has a higher priority. The higher priority entry would therefore include additional information (e.g., the data field of Image1), compared to other, lower priority entries. A higher priority entry could also be displayed with a distinguishing visual enhancement such as a different color.

Step 806 involves setting a preferred initial level of detail. An example is making the user interface 310 of FIG. 3 the initial level of detail in place of the user interface 300. The new initial level of detail can be used in a next session of the application. Thus, the method includes learning a pattern of the user to view the list when the level of detail is at a particular level among a plurality of levels, and, responsive to the learning, initiating the level of detail to the particular level in a subsequent initiation of execution of the application.

Step 808 involves setting level skipping for zoom in or zoom out commands between specified levels. For zoom in, an example is skipping from the user interface 300 of FIG. 3 to the user interface 320 (without displaying the user interface 310). For zoom out, an example is skipping from the user interface 320 to the user interface 300 (without displaying the user interface 310). Different levels can be skipped for zoom in versus zoom out. Step 810 involves setting a higher priority for one or more entries, such as the entry associated with R1 in FIG. 3, as mentioned.

The learning process can learn patterns of behavior over a period of time in which the user accesses the application. This might involve several sessions, where each session involves an initiation of the application and use of the application, followed by closing the application. In addition to the learning process, the user could manually set preferences in terms of factors such as the preferred initial level of detail, level skipping and entry priorities.

Generally, the manner in which information is presented to the user can be set according to patterns of usage by the user. As described above, zooming in from one presentation of a list of data to another may not show additional details for all entries of the list of data. For example, the user may be particularly interested in some entries more than others, and select those entries more frequently for viewing in full detail. If the user exhibits a pattern of selecting certain entries more than others, the system can record such a pattern. In future invocations of a zoom in command, additional data fields can be presented for the entries that the user has frequently selected, compared to other entries. Furthermore, the system may learn a pattern of the user to view the list of data at a particular level of detail. Techniques known in the arts of machine learning and artificial intelligence may be used to mathematically process data recorded about usage of the disclosed technology to change how information is presented to the user.

In one approach, the disclosed technology can be implemented as a list control with a zoom operation in mobile user interface (FIG. 3), a desktop user interface (FIGS. 4A-4C) or a web user interface (FIGS. 5A-5C), for instance. A common reusable list user interface control/component can be provided with the capability for zoom in and zoom out operations. This control can be implemented in any programming language that has user interface support, such JAVA, .NET, DHTML and others. Further, the component can be embedded into the user interface of an application as required.

This control shows a list of values/items when it is initially rendered on a screen. The control allows the user to perform a zoom in operation to bring additional information associated with initial items and display them in the list. This operation increases the space needed for each list item on the user interface so that more information can be displayed for each item. However, fewer items are displayed on the screen concurrently. Similarly, in a zoom out operation, each item display less information. The advantage of zooming out is that more items are displayed on the screen concurrently.

The list control can define the following methods and event handlers for handling zoom operations:

1. Method Zoom(int level) for performing a zoom operation to a specific level
2. Event Handler OnZoom(int level)
  a. The children item of the list define OnZoom(int level) method. When a zoom action occurs in the list control, it iterates all children to call OnZoom, and a parameter "zoom level" is passed in this method call.
  b. Children items decide the data to display and the UI arrangement according to the "zoom level."

The functionality described herein may be implemented using hardware, software or a combination of both hardware and software. For software, one or more non-transitory, tangible processor readable storage devices or apparatuses having processor readable code embodied thereon for programming one or more processors may be used. The non-transitory, tangible processor readable storage devices can include computer readable media such as volatile and non-volatile media, removable and non-removable media.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
    initiating execution of an application which access a plurality of entries;
    in response to the initiating, allocating a display area of a display screen for use by the application, the display area having a fixed height, setting a level of detail to an initial level from among a plurality of available levels to use in a list, determine a number of entries to display in the display area based on the initial level of detail, allocating a number of regions having a common initial height within the display area corresponding to the number of entries, and using each region to display an initial number of one or more lines of text from one of the entries in the list according to the initial level of detail; and
    scrolling the list with a scrolling speed in response to a command of a user, before a user selection of an entry from among the plurality of entries in the display area to be displayed by itself in the display area with a highest level of detail among the plurality of available levels;
    when the scrolling speed increases, decreasing the level of detail with which the plurality of entries are displayed, wherein the decreasing the level of detail comprises displaying a number of lines of text which is less than the initial number of one or more lines of text for each entry, increasing the number of entries and a corresponding number of regions to display in the display area, and decreasing a height of each region while maintaining a common height among the regions and a common number of lines of text in each region; and
    when the scrolling speed subsequently decreases to a non-zero value, increasing the level of detail with which the plurality of entries are displayed to the initial level of detail, wherein the increasing the level of detail with which the plurality of entries are displayed to the initial level of detail comprises displaying the initial number of one or more lines of text for each entry, decreasing the number of entries and a corresponding number of regions to display in the display area, and increasing a height of each region to the common initial height, wherein the list spans the fixed height of the display area when the initial level of detail is set, when the scrolling speed increases and when the scrolling speed decreases.

2. The method of claim 1, wherein:
    each entry of the plurality of entries comprises data fields; and
    a number of the data fields displayed for each region in the display area decreases when the scrolling speed increases.

3. The method of claim 2, wherein:
    the data fields comprise folder names for folders in a file manager application and file names of files in the folders;
    the folder names but not the file names are displayed when the level of detail is at one level of the plurality of available levels; and
    the folder names and a first number of the file names are displayed when the level of detail is increased.

4. The method of claim 3, wherein:
    the folder names and a second number of the file names are displayed when the level of detail is further increased, where the second number is greater than the first number.

5. The method of claim 2, wherein:
    the data fields comprise file names for files in a file manager application and a preview of text of the files;
    the file names but not the preview is displayed when the level of detail is at one level of the plurality of available levels; and
    the file names and the preview with a first amount of the text of the files is displayed when the level of detail is increased.

6. The method of claim 5, wherein:
    the file names and the preview with a second amount of the text of the files is displayed when the level of detail is further increased, where the second amount is greater than the first amount.

7. The method of claim 1, wherein:
    the application manages contact information for a plurality of people;
    each entry of the plurality of entries comprises a line of text with a name and another line of text with another data field of an associated person of the plurality of people;
    the line of text with the name of the person but not the another line of text with the another data field is displayed in each region in the display area when the scrolling speed increases; and
    the line of text with the name of the person and the another line of text with the another data field are displayed in each region in the display when the scrolling speed subsequently decreases.

8. The method of claim 1, wherein:
    entries of the plurality of entries are classified into a category from among a plurality of categories and comprises a data field independent of the category and a data field dependent on the category; and
    the increasing the level of detail with which the plurality of entries are displayed comprises transitioning from displaying the entries with the data field independent of the category but not the data field dependent on the category, to displaying the entries with the data field independent of the category and the data field dependent on the category.

9. The method of claim 1, wherein:
    entries of the plurality of entries are classified into a category from among a plurality of categories; and
    the increasing the level of detail with which the plurality of entries are displayed comprises transitioning from displaying the entries where the height of the regions is common, to displaying the entries where the heights of the regions vary with the categories.

10. The method of claim 1, further comprising:
    displaying a single entry of the plurality of entries in the display area in response to a user selection of the single entry when the level of detail is at any of the plurality of available levels.

11. The method of claim 1, further comprising:
learning a pattern of a user to view the list when the level of detail is at a particular level among the plurality of available levels; and
responsive to the learning, initiating the level of detail to the particular level in a subsequent initiation of execution of the application.

12. The method of claim 1, further comprising:
learning a pattern of a user to view the list when the level of detail is at a particular level among the plurality of available levels, wherein the increasing the level of detail with which the plurality of entries are displayed skips a level of the plurality of available levels in response to the learning.

13. A system, comprising: a display screen comprising a display area; a storage device configured to store code; and a processor associated with the display screen, the processor programmed to: set a level of detail to an initial level from among a plurality of available levels to use in a list; determine a number of entries of a plurality of entries to display in the display area based on the initial level of detail; allocate a number of regions having a common initial height within the display area corresponding to the number of entries, the display area having a fixed height; use each region to display an initial number of one or more lines of text from one of the entries in the list according to the initial level of detail; scroll the list with a scrolling speed; and when the scrolling speed increases, decrease the level of detail with which the plurality of entries are displayed, wherein to decrease of the level of detail with which the plurality of entries are displayed, the processor is programmed to display a number of lines of text which is less than the initial number of one or more lines of text for each entry, increase the number of entries and a corresponding number of regions to display in the display area, and decrease a height of each region while maintaining a common height among the regions and a common number of lines of text in each region.

14. The system of claim 13, wherein:
when the scrolling speed subsequently decreases to a non-zero value, the processor is programmed to increase the level of detail with which the plurality of entries are displayed to the initial level of detail; and
to increase the level of detail with which the plurality of entries are displayed to the initial level of detail, the processor is programmed to display the initial number of one or more lines of text for each entry, decrease the number of entries and a corresponding number of regions to display in the display area, and increase a height of each region to the common initial height.

15. The system of claim 14, wherein:
the list spans the fixed height of the display area when the initial level of detail is set, when the scrolling speed increases and when the scrolling speed decreases.

16. The system of claim 13, wherein:
the processor is programmed to, in response to a user selection, display an entry from among the plurality of entries in the display area with a highest level of detail among the plurality of available levels.

17. A computing device, comprising:
a memory configured to store code; and
a processor configured to execute the code to:
determine a number of entries of a plurality of entries to display in a display area based on an initial level of detail among a plurality of available levels to use in a list;
allocate a number of regions having a common initial height within a display area corresponding to the number of entries, the display area having a fixed height;
use each region to display an initial number of one or more lines of text from one of the entries in the list according to the initial level of detail;
scroll the list with a scrolling speed; and
when the scrolling speed increases, decrease a level of detail with which the plurality of entries are displayed,
wherein to decrease of the level of detail with which the plurality of entries are displayed, the processor is configured to execute the code to display a number of lines of text which is less than the initial number of one or more lines of text for each entry, increase the number of entries and a corresponding number of regions to display in the display area, and decrease a height of each region while maintaining a common height among the regions and a common number of lines of text in each region.

18. The computing device of claim 17, wherein:
different entries have different priorities; and
a number of data fields displayed for each entry is based on the priority of the entry.

19. The computing device of claim 17, wherein:
when the scrolling speed subsequently decreases to a non-zero value, the processor is configured to execute the code to increase the level of detail with which the plurality of entries are displayed to the initial level of detail; and
to increase the level of detail with which the plurality of entries are displayed to the initial level of detail, the processor is configured to execute the code to display the initial number of one or more lines of text for each entry, decrease the number of entries and a corresponding number of regions to display in the display area, and increase a height of each region to the common initial height.

20. The computing device of claim 19, wherein:
the list spans the fixed height of the display area when the initial level of detail is set, when the scrolling speed increases and when the scrolling speed decreases.

* * * * *